(No Model.)  3 Sheets—Sheet 3.
H. G. McKERROW.
APPARATUS FOR BLEACHING.
No. 570,675. Patented Nov. 3, 1896.
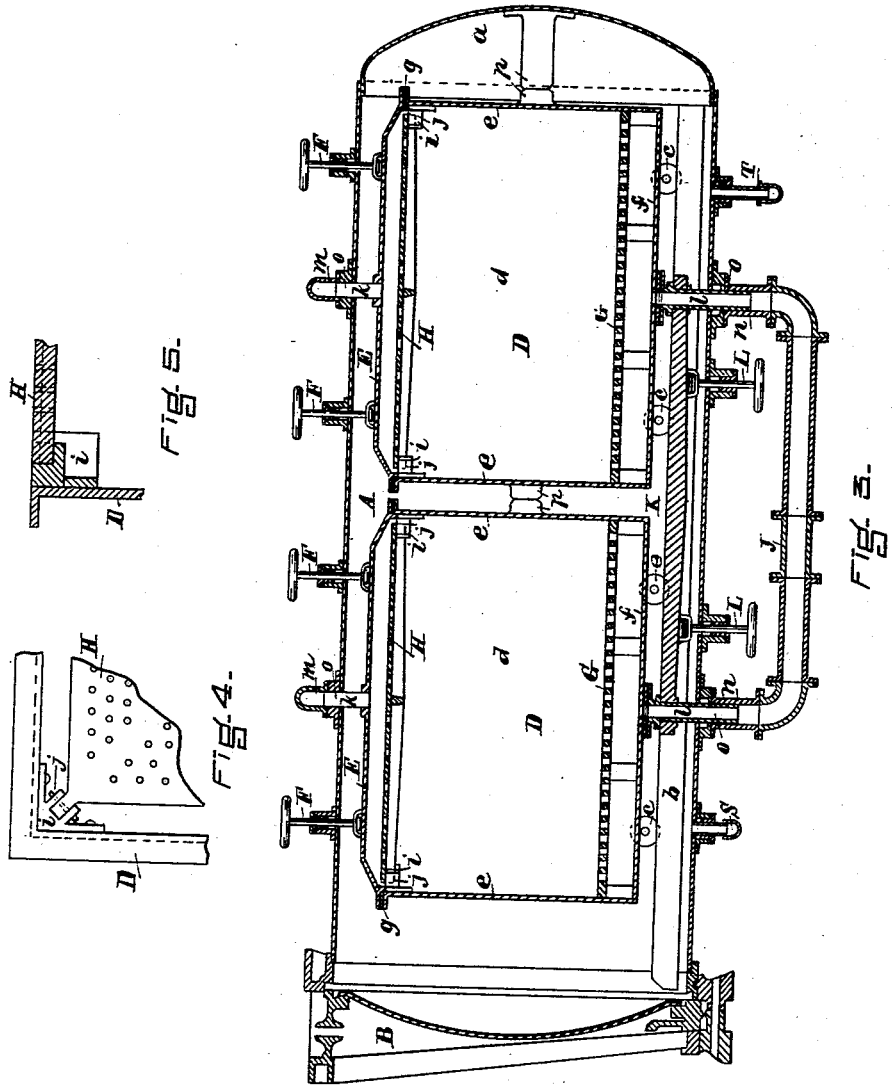
WITNESSES.
A. D. Snow
Charles W. Jones
INVENTOR—
Herbert G. McKerrow,
per Edw. Drummer.
Atty.

UNITED STATES PATENT OFFICE.

HERBERT G. McKERROW, OF MEDFORD, MASSACHUSETTS.

APPARATUS FOR BLEACHING.

SPECIFICATION forming part of Letters Patent No. 570,675, dated November 3, 1896.

Application filed November 20, 1895. Serial No. 569,576. (No model.)

*To all whom it may concern:*

Be it known that I, HERBERT G. McKERROW, a subject of the Queen of Great Britain, and a resident of Medford, county of Middlesex, and State of Massachusetts, have invented a new and useful Improvement in Apparatus for Bleaching Fibers and Fabrics, of which the following is a specification, reference being had to the accompanying drawings.

My invention relates to an apparatus for bleaching fibers and fabrics, especially those of wool and animal hair, the object being to so construct and adapt such apparatus that the material may be bleached satisfactorily in large quantities by the use of peroxid of hydrogen or other bleaching liquids.

The invention consists in an apparatus embodying a vessel and trucks, or like receptacles, to enter the vessel, the trucks or the like being suitable to receive the material to be bleached and adapted and combined with certain devices to provide for an even distribution and free circulation of the bleaching liquid through said material and to prevent said liquid from escape therefrom into the space between said trucks and the interior of said vessel, and said vessel being adapted and combined with certain devices to receive steam for heating purpose into said space, substantially as hereinafter set forth, and specifically pointed out in the claims.

Figure 1:
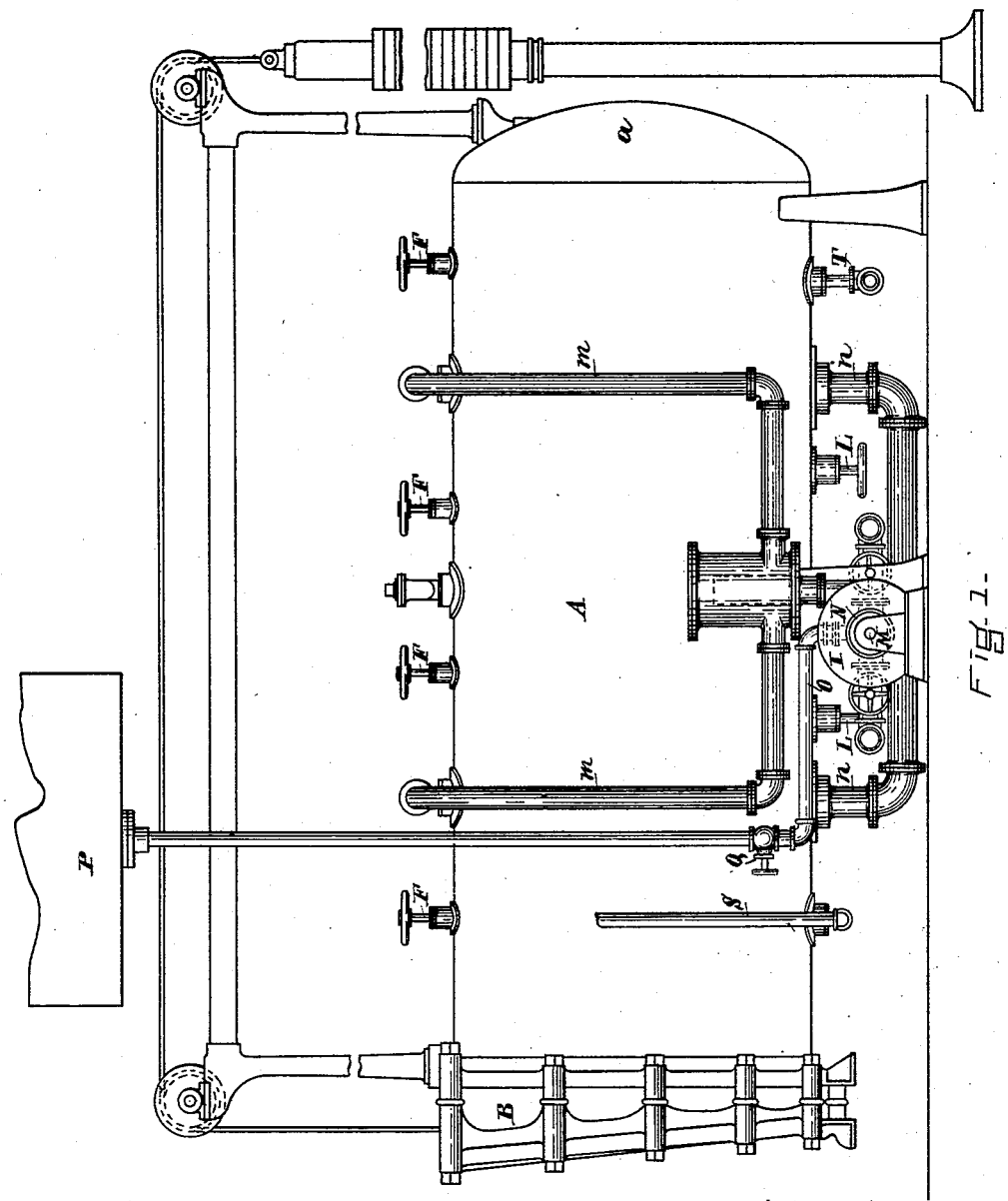
Figure 2:
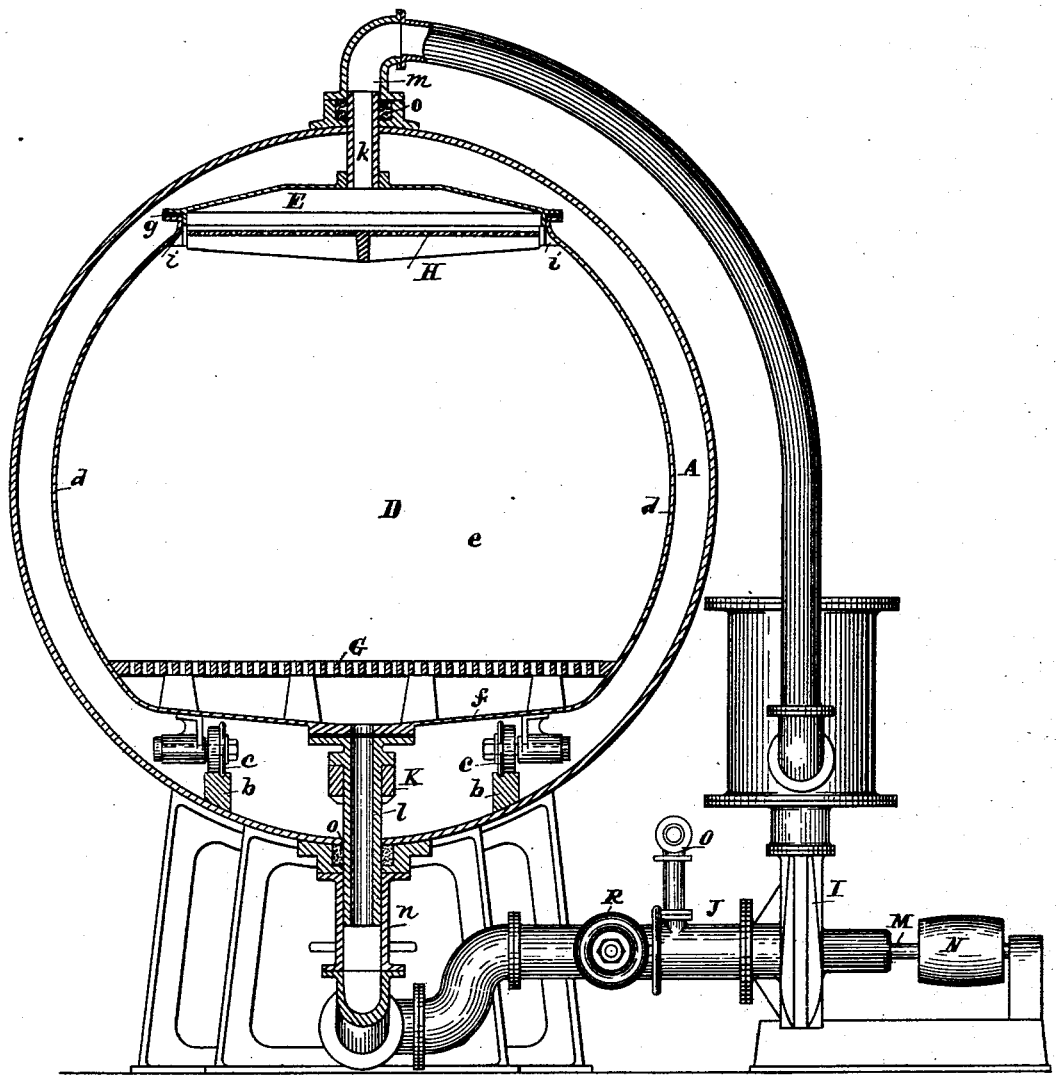

In the drawings, (three sheets,) Figure 1 is a side elevation of an apparatus embodying my invention. Fig. 2 is a transverse vertical section of the same on a larger scale. Fig. 3 is a longitudinal vertical section. Figs. 4 and 5 show details.

The vessel A, preferably in form like a horizontal cylindrical boiler, closed permanently at one end $a$, is provided at the other end with a door B, which may be slid vertically to open or close at will the opening at this end of the vessel, (by well-known mechanism shown in part and which it is not necessary to describe herein.)

In the vessel A and at the lower part thereof are longitudinal rails $b$ to sustain and guide the wheels $c$ of the trucks D. Two trucks are shown, though there may be as many as desired. Each truck is so formed of sides $d$, ends $e$, and bottom $f$, and provided with a cover E and bushing $g$ between the upper rim and cover that the truck may be made liquid-tight. Each cover E is raised or lowered and pressed down onto its truck by means of hand-screws F. Each truck is provided with a perforated plate or secondary bottom G, between which and the bottom $f$ there is ample space for the purpose hereinafter specified. Each truck is also provided with a perforated plate H, which may lie horizontally in the upper part of the truck, being supported by the corner-brackets $i$ and held in position by pins $j$, extending through these brackets and ribs of the plate H, as shown. When the plate H and the cover E are in place, there is a space between plate and cover ample for the purpose hereinafter specified.

Each cover E is provided with a short vertical pipe $k$, opening into the truck. There is an opening in the bottom of each truck opposite the end of a short pipe $l$, (when the truck is in position in the vessel A.) The pipes $k$ may slip endwise in pipes $m$, secured to the vessel A at the top thereof, and the pipes $l$ into pipes $n$, secured to the vessel A at the bottom thereof. The pipes $m$ extend to one side of a pump I and the pipes $n$ extend as one conduit J to the other side of the pump I. The short pipes $l$ may be raised and lowered by means of a yoke K and hand-screws L. The pump I being rotary, is operated by means of the shaft M and pulley N. The slip-joints $o$ are to be steam-tight. A pipe O extends from one side of the pump to a tank P for supplying the bleaching liquid. There is a stop-cock Q in the pipe O and also a stop-cock R in the conduit J. A pipe S admits steam to the vessel A, and there is a short pipe and stop-cock T or check-valve to allow the passage of the water of condensed steam from the vessel A.

In operation the trucks D, being outside of the vessel A and open at the top, receive the material to be bleached. The perforated plate H for each truck is then secured in place above said material, and the trucks run into the vessel A (the door B having been raised) on the rails $b$ the required distance, which is determined by means of buffers $p$. The door B is then lowered in place to close the end of the vessel A and make a steam-tight joint therewith, the covers E are closed down onto the trucks to make a liquid-tight joint therewith by means of the screws F, and the pipes *l* are slid up so as to make liquid-tight joints with the bottoms of the trucks by means of the yoke K and screws L. The cock Q being open and the cock R closed, the pump is put into operation so as to draw the bleaching liquid from the supply-tank and force the same into the trucks D. When as much liquid as desired has been received by the trucks, the cock Q is closed and the cock R opened, so that on continued operation of the pump the liquid is repeatedly forced through the trucks and material therein to be bleached. After the trucks have been supplied with the required amount of liquid, steam is admitted into the vessel A, filling the space between the interior of this vessel and the trucks. Thus during the operation of repeatedly forcing the liquid through the trucks and material therein the trucks and contents are heated to the required degree, and are maintained at that heat to facilitate the process of bleaching. After the material has thus been sufficiently treated the cock Q is opened and the cock R closed, so that by reversing the operation of the pump the bleaching liquid may be withdrawn from the trucks and forced back into the supply-tank.

Owing to each perforated plate H and the space between the same and the corresponding cover E, the bleaching liquid is caused to be distributed upon and forced through the material to be bleached substantially uniformly, so that all parts of the material will be equally treated.

I am well aware that an apparatus has heretofore been in use for treating materials, embodying an outer vessel similar to the vessel A and provided with a door situated and operated like the door B, and trucks for containing the material to be treated run into said vessel on rails, as done in the present apparatus; but in such apparatus heretofore known the liquid for treating the material has been forced by a pump into the top of each truck directly onto the material, striking the latter at one place, and this liquid has been allowed to percolate through a perforated bottom of each truck directly into the outer vessel (corresponding to the vessel A) and drawn therefrom, there having been nothing in each truck corresponding to the perforated plate H above the material, nor any provision to prevent the liquid from entering the vessel A. Now with the liquid, peroxid of hydrogen, which I propose to use in my apparatus, such construction would not be desirable, if, indeed, possible. By the perforated plate H, I secure much better distribution of the liquid, preventing that unequal treatment of the material which has heretofore occurred. Owing to the great oxidizing power of the liquid which I employ, great care must be exercised to prevent the same from coming in contact with parts of the apparatus which should be kept intact. By my construction this liquid will come in contact only with the interior surfaces, (of the trucks and pipes leading thereto,) which I form of an alloy of lead, and will not come in contact with the interior surface of the vessel A, pump, and other parts of the apparatus, as will readily appear.

The method of bleaching by means of peroxid of hydrogen, which may be carried out by means of the apparatus herein described, is possible by other means, and therefore I intend to make another application for said method.

I claim as my invention—

1. In a bleaching apparatus, the combination of an outer vessel and means for closing the same, a receptacle within said outer vessel to receive the material to be bleached, and means for forcing liquid through said receptacle, said receptacle being sufficiently smaller than, and closed with reference to, said vessel, so that there is a space between the interior surface of said outer vessel and the inner receptacle into which said liquid cannot enter, substantially as set forth.

2. In a bleaching apparatus, the combination of an outer vessel, means for closing the same, a receptacle within said outer vessel to receive the material to be bleached, means for forcing liquid through said receptacle from the upper to the lower part thereof, and a perforated plate in the upper part of said receptacle through which the liquid must pass, said receptacle being sufficiently smaller than, and closed with reference to, said vessel, so that there is a space between said receptacle and the interior of said vessel into which said liquid cannot enter, substantially as set forth.

3. In a bleaching apparatus, the combination of an outer vessel, means for closing the same, a receptacle within said outer vessel to receive the material to be bleached, means for forcing liquid through said receptacle from the upper to the lower part thereof, a perforated plate in the upper part of said receptacle and another perforated plate in the lower part of said receptacle, said liquid being caused to pass through the openings in said plates, and said receptacle being sufficiently smaller than, and closed with reference to, said vessel, so that there is a space between said receptacle and the interior surface of said vessel into which said liquid cannot enter, substantially as set forth.

4. The combination of a vessel provided with a door, a truck to enter said vessel through the doorway on ways, a cover for said truck, means for closing the cover closely onto the truck, a pump, pipes leading from the upper and lower parts of said truck to said pump, and clamping devices operated outside of said vessel to clamp said pipes to the truck, thus preventing any opening from the truck into the space outside of the truck and within said vessel, substantially as set forth.

5. The combination of a vessel provided with a door and ways, a truck to enter said vessel on said ways, means for filling the space between the interior surface of said vessel and said truck with steam, a cover for the truck, screws extending to the outside of said vessel for closing down said cover onto the truck, a perforated plate or secondary bottom in said truck, a perforated plate in the upper part of said truck, a pump, a pipe provided with a slip or flexible joint extending from the upper part of said truck to said pump, a pipe provided with a slip or flexible joint extending from the bottom of said truck to said pump, and a screw extending to the outside of said vessel for causing the pipe leading from the lower part of the truck to make a tight joint therewith, substantially as described.

HERBERT G. McKERROW.

Witnesses:
L. S. WHITNEY,
EDW. DUMMER.